(12) United States Patent
Omata et al.

(10) Patent No.: US 6,362,580 B1
(45) Date of Patent: Mar. 26, 2002

(54) CONTROLLER OF VEHICLE PROPULSION SYSTEM

(75) Inventors: Yoshiaki Omata; Kazuhiko Morimoto, both of Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/523,209

(22) Filed: Mar. 10, 2000

(30) Foreign Application Priority Data

Mar. 10, 1999 (JP) .......................................... 11-062982

(51) Int. Cl.$^7$ ................................................ H02P 1/00
(52) U.S. Cl. ....................... 318/139; 318/376; 318/140; 318/152; 180/65.3
(58) Field of Search ................................ 318/139, 376, 318/140, 151; 180/65.2, 65.3, 65.4

(56) References Cited

U.S. PATENT DOCUMENTS

| | | | |
|---|---|---|---|
| 4,531,491 A | 7/1985 | Iiyama et al. ................ 123/357 |
| 4,589,071 A | 5/1986 | Yamamuro et al. ....... 364/424.1 |
| 4,653,621 A | 3/1987 | Oshiage ........................ 192/32 |
| 5,172,784 A | 12/1992 | Varela, Jr. ................... 180/65.4 |
| 5,343,970 A | * 9/1994 | Severinsky ................. 180/65.2 |
| 5,495,906 A | * 3/1996 | Furutani .................... 180/65.2 |
| 5,632,238 A | 5/1997 | Furukawa et al. ......... 123/179.3 |
| 5,698,905 A | * 12/1997 | Ruthlein ....................... 290/32 |
| 5,751,137 A | 5/1998 | Kiuchi et al. .................. 322/14 |
| 5,757,153 A | 5/1998 | Ito et al. ..................... 318/370 |
| 5,762,156 A | * 6/1998 | Bates et al. .................. 180/165 |
| 5,771,478 A | 6/1998 | Tsukamoto et al. ........... 701/68 |
| 5,839,533 A | 11/1998 | Mikami et al. ............. 180/165 |
| 5,841,201 A | 11/1998 | Tabata et al. ............. 290/40 C |
| 5,895,333 A | 4/1999 | Morisawa et al. ............. 475/5 |
| 5,898,282 A | 4/1999 | Drozdz et al. .............. 318/139 |
| 5,927,415 A | * 7/1999 | Ibaraki et al. ............. 180/65.2 |
| 5,941,796 A | 8/1999 | Lee ............................ 477/158 |
| 5,935,040 A | 10/1999 | Tabata et al. .................. 477/3 |
| 5,960,897 A | 10/1999 | Furuya et al. ............. 180/65.4 |
| 6,018,199 A | 1/2000 | Shiroyama et al. ....... 290/37 A |
| 6,032,753 A | 3/2000 | Yamazaki et al. ......... 180/65.3 |
| 6,054,776 A | 4/2000 | Sumi ........................... 290/17 |
| 6,110,066 A | * 8/2000 | Nedungadi et al. ............ 475/5 |
| 6,116,364 A | * 9/2000 | Taguchi et al. ............ 180/65.2 |

FOREIGN PATENT DOCUMENTS

| | | |
|---|---|---|
| EP | 0 460 850 | 12/1991 |
| JP | 5-322032 | 12/1993 |
| JP | 8-182109 | 7/1996 |
| JP | 9-89090 | 3/1997 |
| JP | 9-93724 | 4/1997 |
| JP | 9-191507 | 7/1997 |
| JP | 9-238403 | 9/1997 |
| JP | 10-136508 | 5/1998 |
| JP | 10-169535 | 6/1998 |
| JP | 10-201013 | 7/1998 |
| JP | 2000-13911 | 1/2000 |

* cited by examiner

Primary Examiner—Jeffrey Donels
Assistant Examiner—Rina I. Duda
(74) Attorney, Agent, or Firm—Flynn, Thiel, Boutell & Tanis, P. C.

(57) ABSTRACT

A vehicle is provided with an engine and a motor, which has driving and electric generating functions and which is directly connected to the engine as a vehicle propulsion system, an engine controller for controlling the operating condition of the engine, and a motor controller for controlling the driving and electric generating conditions of the motor based on the operating condition of the engine and the driving condition of the vehicle independently from the control of the engine made by the engine controller. The vehicle runs by only utilizing its engine by simplifying the control of the engine and motor, and by improving the reliability of the motor controller.

18 Claims, 9 Drawing Sheets

| MAP | DRIVING TORQUE |
|---|---|
| MOTOR SPEED | LOWER LIMIT DISCRIMINATING VOLTAGE DURING DRIVING |

| MAP | DRIVING TORQUE |
|---|---|
| MOTOR SPEED | MAXIMUM VALUE OF VOLTAGE CHANGE RIGHT AFTER STARTING DRIVE |

| MAP | DRIVING TORQUE |
|---|---|
| MOTOR SPEED | MAXIMUM VALUE OF VOLTAGE DROP DURING DRIVING |

| MAP | POWER GENERATING TORQUE |
|---|---|
| MOTOR SPEED | UPPER LIMIT VOLTAGE DURING POWER GENERATION |

CONTROLLER OF VEHICLE PROPULSION SYSTEM

FIELD OF THE INVENTION

The present invention relates to a controller of a vehicle propulsion system and, more specifically, to a controller of a vehicle propulsion system which allows a vehicle to run only by an engine by simplifying the control of the engine and an electrical motor and by improving the reliability of the control of the motor.

BACKGROUND OF THE INVENTION

Among vehicles, there exists a so-called hybrid car carrying an internal combustion engine and an electric motor as power sources for its propulsion system. Such vehicle is provided with engine control means and motor control means for controlling operating conditions of the engine and the motor. In driving the vehicle, the engine control means and the motor control means detect the operating conditions of the engine and the motor, respectively, and exchange detected operation data of the engine and the motor with each other to control the operating conditions of the engine and the motor in coordination and to achieve the required performances (fuel consumption, value of detrimental components in the exhaust gas, power performance and others) to a high degree.

Examples of controllers of such vehicles, are disclosed in Japanese Patent Laid-Open Nos. 1997-74710 and 1998-67243, Japanese Utility Model Laid-Open No: 1993-61432 and 1993-72544, and Japanese Patent Laid-Open No. 1997-329060.

The controller disclosed in Japanese Patent Laid-Open No. 1997-74710 is one where a differential gear mechanism which outputs driving force to at least two output shafts is linked to an internal combustion engine, first and second rotary motors are linked to the differential gear mechanism and either one of rotary shafts of the first and second rotary motors is inserted to the inside of the other motor so that the shaft rotates freely, to dispose the differential gear mechanism and both rotary motors on one and the same axis.

The invention disclosed in Patent Laid-Open No. 1998-67243 is a vehicle in which the driving force of an engine is transmitted to wheels via an automatic transmission and which is provided with an auxiliary driving source that is capable of driving wheels independently from the drive of the engine and control means which drives the other wheels by the auxiliary driving source when the engine stops.

One invention disclosed in Japanese Utility Model Laid-Open No. 1993-61432 is provided with electric generation control means and motor control means for controlling the rotary motor in a hybrid engine in which a rotary motor having power generating and motor functions is connected in parallel to a driving system of an internal combustion engine. The motor control means is provided with motor mode control means for setting drive assistance only for a predetermined period of time when the temperature is low and engine load setting means for setting engine output to supplement deficient output of the drive assisting amount.

One invention disclosed in Utility Model Laid-Open No. 1993-72544 is where an induction machine having motor and electricity generating functions is assembled to an engine of a crawler working vehicle and is provided with control means for supplying torque to the engine from the induction machine when output torque of the engine is large and for charging a battery by causing the induction machine to generate electricity with the extra torque when the output torque of the engine is small.

One invention disclosed in Japanese Patent Laid-Open No. 1997-329060 includes reflux control means for controlling an opening valve of reflux means so as to reflux exhaust gas to an intake pipe when fuel cut control is executed while operating an engine of a hybrid car.

As previously mentioned, in the prior art controllers of the so-called hybrid car, the engine control means and the motor control means exchange the operation data of the engine and the motor detected by the engine control means and the motor control means in driving the vehicle to control the operating conditions of the engine and the motor in coordination.

However, such vehicular controller has a problem that the control is complicated because the engine control means and the motor control means control in coordination with each other. Accordingly, such controller has had problems due to its complicated control process such that the reliability of the controller drops and costs increase.

SUMMARY OF THE INVENTION

In order to eliminate or minimize the above-mentioned problems, the present invention is characterized in that a vehicle is provided with an internal combustion engine, an electric motor which has driving and electric generating functions and is directly connected to the engine as a vehicle propulsion system, engine control means for controlling the operating condition of the engine, and motor control means for controlling the driving and power generating conditions of the motor based on the operating condition of the engine and the driving condition of the vehicle independently from the control of the engine by the engine control means.

Because the controller of the inventive vehicle propulsion system is provided with a motor, which has driving and electric generating functions and which is directly connected to the engine, engine control means for controlling the operating condition of the engine, and motor control means for controlling the driving and electric generating conditions of the motor based on the operating condition of the engine and the driving condition of the vehicle independently from the control of the engine made by the engine control means, the engine control means and the motor control means may be independent from each other and the engine and the motor may be controlled separately by the respective control means, thus simplifying the controller and its functions. It is noted that although the motor control means controls the motor without mutually exchanging its output with the engine control means, it shares a part of the input with the engine control means to detect the operating condition of the engine and the driving condition of the vehicle to utilize same for the control of the motor.

BRIEF DESCRIPTION OF THE DRAWINGS

An embodiment of the invention will be explained below in conjunction with the drawings.

DETAILED DESCRIPTION

Figure 13:
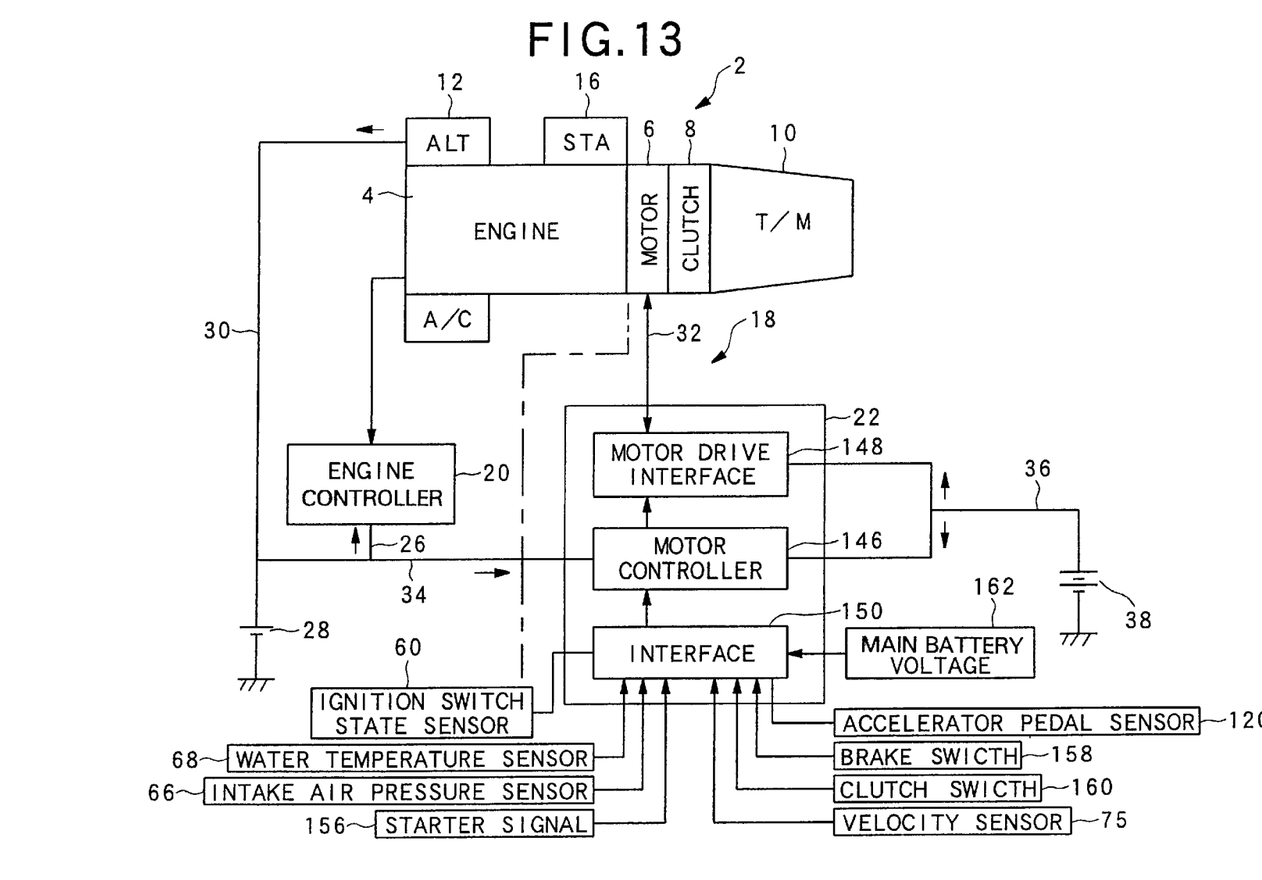
FIG. 13 is a diagram showing the system of the controller of the vehicle propulsion system.

In FIG. 13, reference numeral 2 denotes a vehicle propulsion system of a vehicle (not shown), 4 an internal combustion engine, 6 an electrical motor, 8 a clutch, and 10 a manual transmission. This vehicle is provided with the engine 4 and the motor 6, which has driving and electric generating functions, as the vehicle propulsion system 2.

The motor 6 is directly connected to the engine 4 and the manual transmission 10 is directly connected to the motor 6 through the clutch 8. The engine 4 is provided with an alternator 12, an A/C (air conditioner) compressor 14, and a starter motor 16.

The vehicle propulsion system 2 has a controller 18 with engine control means 20 for controlling the operating condition of the engine 4 and motor control means 22 for controlling driving conditions and electric generating conditions of the motor 6.

The engine 4 is connected to the engine control means 20 by an engine controlling signal line 24. The term "line" herein refers to an electrical connection. The engine control means 20, which may be an electronic decision making device, for example a computer or processor, is connected to a sub-battery 28 by an engine control means power line 26. The sub-battery 28 is connected to the alternator 12 by a sub-battery charging power line 30.

The motor 6 is connected to the motor control means 22 by a motor controlling signal line 32. The motor control means 22, which may be an electronic decision making device, for example a computer or processor, is connected to the sub-battery 28 by the motor control means sub-power line 34 via the engine control means power line 26 and is connected to a main battery 38 by a motor control means main power line 36. The main battery 38 supplies driving power to the motor 6 and is charged by the electricity generated by the motor 6.

Figure 14:
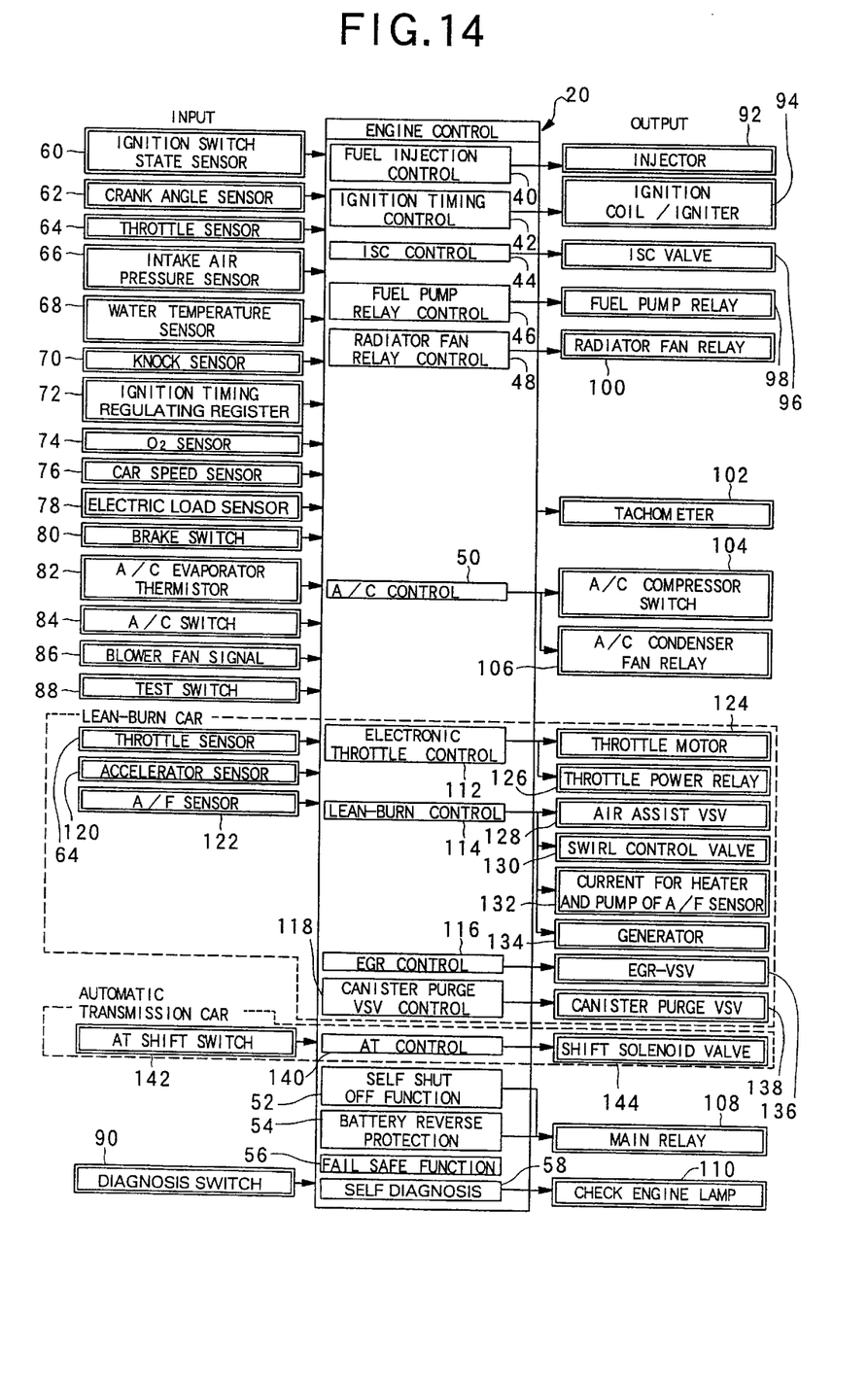
FIG. 14 is a schematic view of engine control means.

As shown in FIG. 14, the engine control means 20 is provided with a fuel injection control section 40, an ignition timing control section 42, an idle speed control (ISC) section 44, a fuel pump relay control section 46, a radiator fan relay control section 48, an air conditioner (AC) control section 50, a self-shut off function section 52, a sub-battery reverse connection protection function section 54, a fail-safe function section 56 and a self-diagnosis section 58.

An ignition switch 60, a crank angle sensor 62, a throttle sensor 64, an intake air pressure sensor 66, a water temperature sensor 68, a knock sensor 70, an ignition timing regulating register 72, an 02 sensor 74, a car speed sensor 76, an electric load 78, a brake switch 80, an A/C evaporator thermistor 82, an A/C switch 84, a blower fan 86, a test switch 88 (within a diagnostic monitor coupler) and a diagnosis switch 90 (within the diagnostic monitor coupler) are provided at the input side of the engine control means 20.

An injector 92, an ignition coil/igniter 94, an ISC valve 96 (in a non lean-burn car), a fuel pump relay 98, a radiator fan relay 100, a tachometer 102, an A/C compressor clutch 104, an A/C condenser fan relay 106, a main relay 108 and a check engine lamp 110 are provided at the output side of the engine control means 20.

When the engine is a lean-burn engine, the engine control means 20 is provided with an electronic throttle control section 112, a lean-burn control section 114, an EGR control section 116, and a canister purge valve control section 118 as shown within a broken line in FIG. 14. In this case, an accelerator sensor 120 and air/fuel (A/F) sensor 122 are provided at the input side of the engine control means 20 in addition to the throttle sensor 64. A throttle motor 124, a throttle power relay 126, an air assist valve 128, a swirl control valve 130, a heater and a pump 132 of the A/F sensor 122, a generator 134, an EGR valve 136 and a canister purge valve 138 are connected at the output side of the engine control means 20.

Further, when the transmission is an automatic transmission, the engine control means 20 is provided with an automatic transmission (AT) control section 140 as shown within broken line in FIG. 14. In this case, an AT shift switch 142 is connected to the input side of the engine control means 20 and a shift solenoid valve 144 is connected to the output side of the engine control means 20.

The engine control means 20 controls operating conditions of the engine 4 such as the fuel injection amount and ignition timing by driving the injector 92, the ignition coil/igniter 94 and others by signals inputted from the crank angle sensor 62, the throttle sensor 64 and others.

Figure 15:
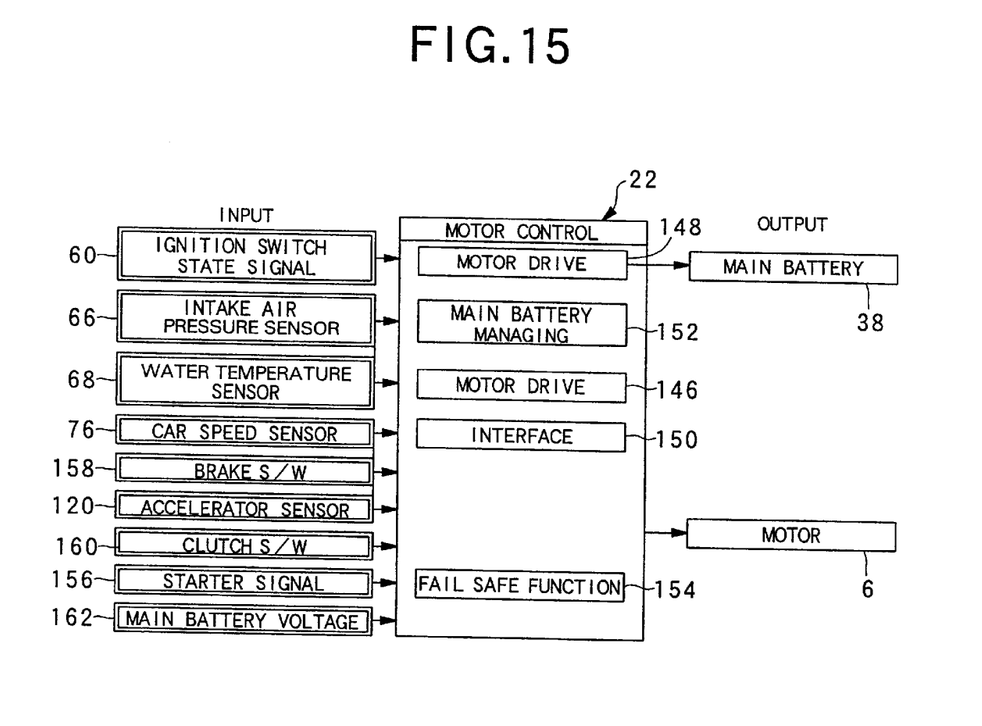
FIG. 15 is a schematic view of motor control means.

The motor control means 22 is provided with a motor control section 146, a motor driving section 148, an input/output processing section (interface) 150, a main battery state managing section 152 and a fail-safe section 154 as shown in FIG. 15.

In addition to the ignition switch 60, the intake air pressure sensor 66, the water temperature sensor 68, the car speed sensor 76 and the accelerator sensor 120, a starter switch 156, a brake switch 158, a clutch switch 160 and a main battery voltage detector 162 are connected to the input side of the motor control means 22.

The motor 6 is connected to the output side of the motor control means 22. The main battery 38 is also connected to the output side of the motor control means 22.

The controller 18 of the vehicle propulsion system 2 is provided with the engine control means 20 for controlling the control sections of the engine 4 and the motor control means 22 for controlling the driving state and electric generating state of the motor 6 as described above. The motor control means 22 judges and controls the driving and power generating conditions of the motor 6 by itself based on the operating condition of the engine 4 and the driving state of the vehicle independently from the control of the engine 4 made by the engine control means 20—without exchanging data with the engine control means 20.

Figure 3:
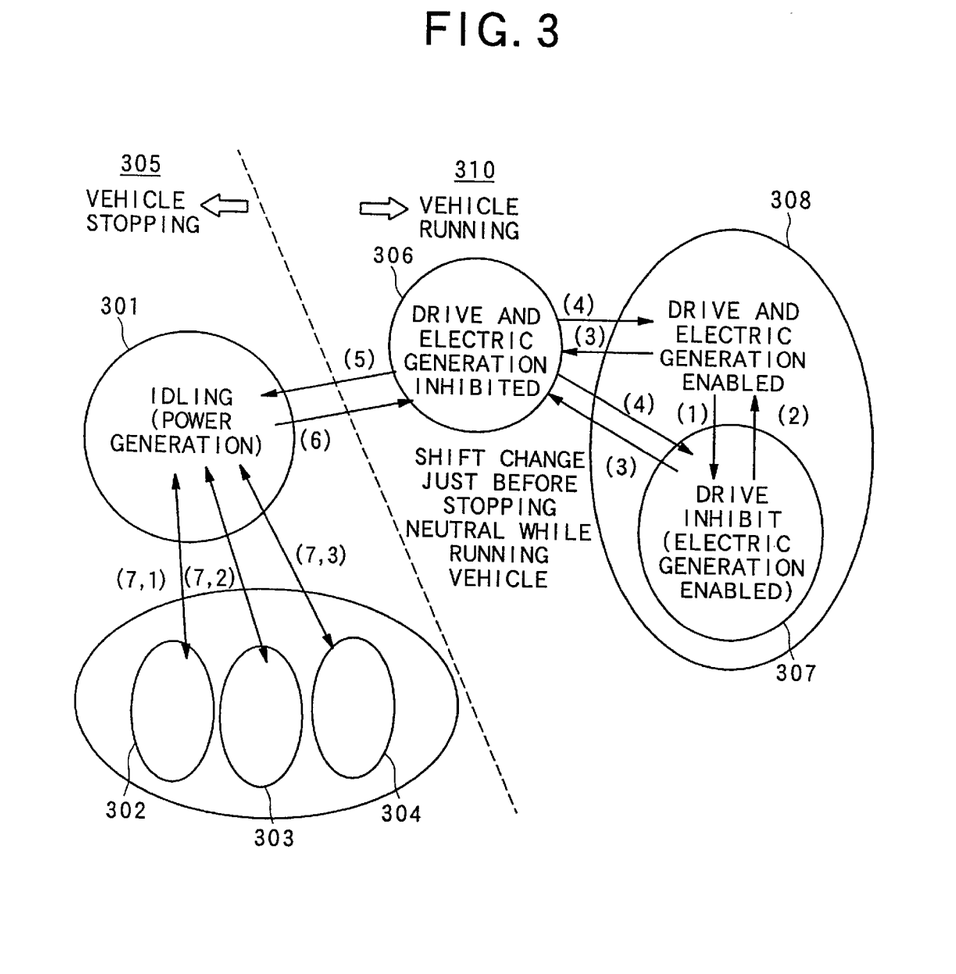
FIG. 3 is a diagram showing the transition of the control states.

The motor control means 22 is provided with a stopping control state and a running control state which are control states based on the driving state of the vehicle as shown in FIG. 3 and controls via driving and electric generation prohibiting control states the stopping of the driving of the motor 6 and electric generation by the same when transferring between these stopping and running control states.

The motor control means 22 also inputs a main battery voltage signal from the main battery voltage detector 162 for detecting main battery voltage of the main battery 38, which supplies driving power to the motor 6 and which is charged by power generated by the motor 6, and controls the state of the main battery based on the value of the main battery voltage by means of the main battery state managing section 152.

Figure 1:
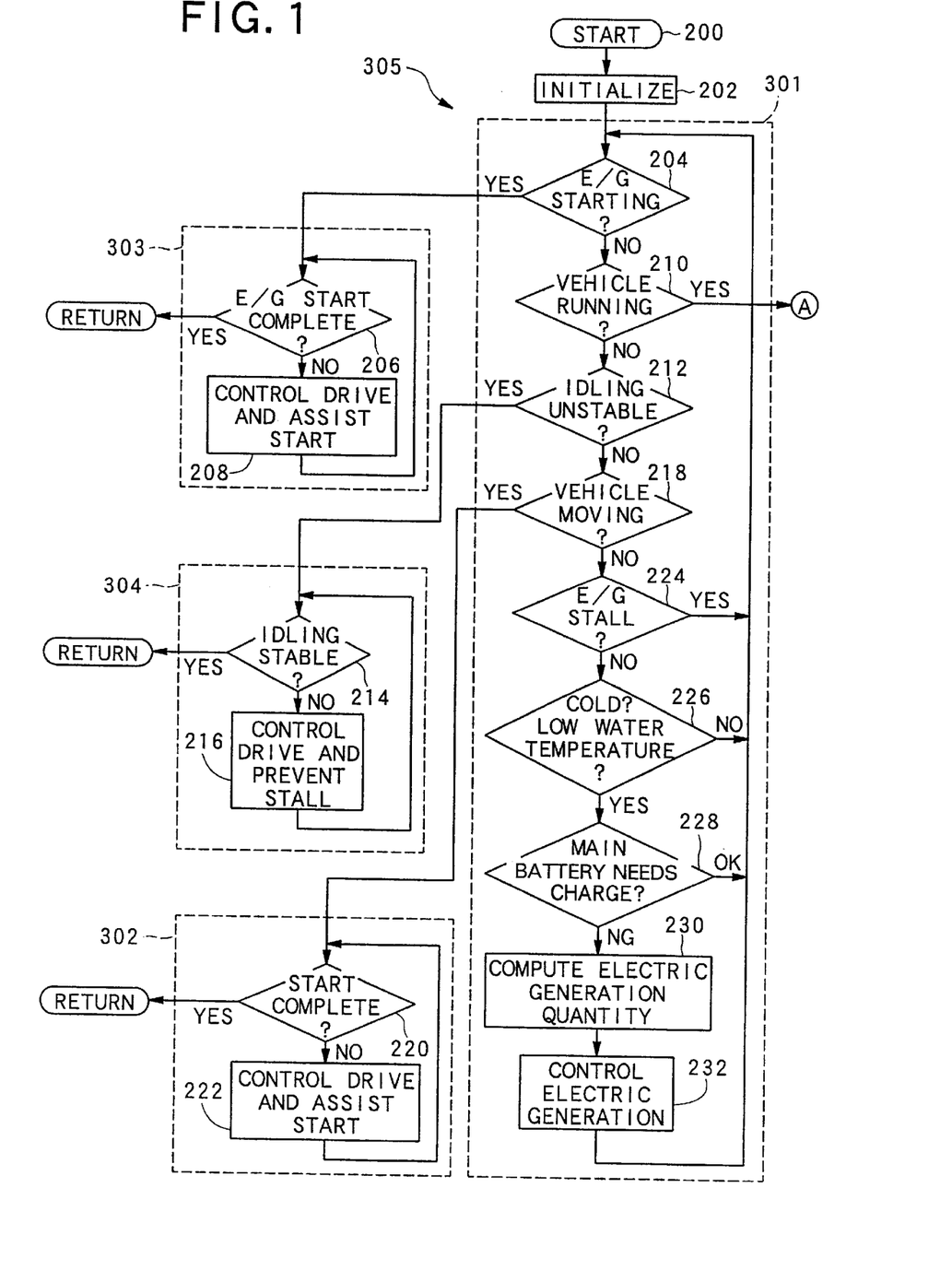
FIG. 1 is a control flowchart of a controller in a stopping control state showing an embodiment of the invention.

Further, the motor control means 22 is provided, as shown in FIG. 1, with an idling electric generating control state (idling state) 301, a vehicle movement initiation drive control state 302, an engine starting drive control state 303, and an idling stabilizing drive control state 304 set as the stopping control states 305. The motor control means 22 controls so as to generate electricity by the motor 6 to charge the main battery 38 in the idling power generating control state, to assist the start of movement of the vehicle by driving the motor 6 in the vehicle movement initiation drive control state, to assist the start of the engine 4 by driving the motor 6 in the engine starting drive control state, and to stabilize the idling of the engine 4 by driving the motor 6 in the idling stabilizing drive control state.

Figure 2:
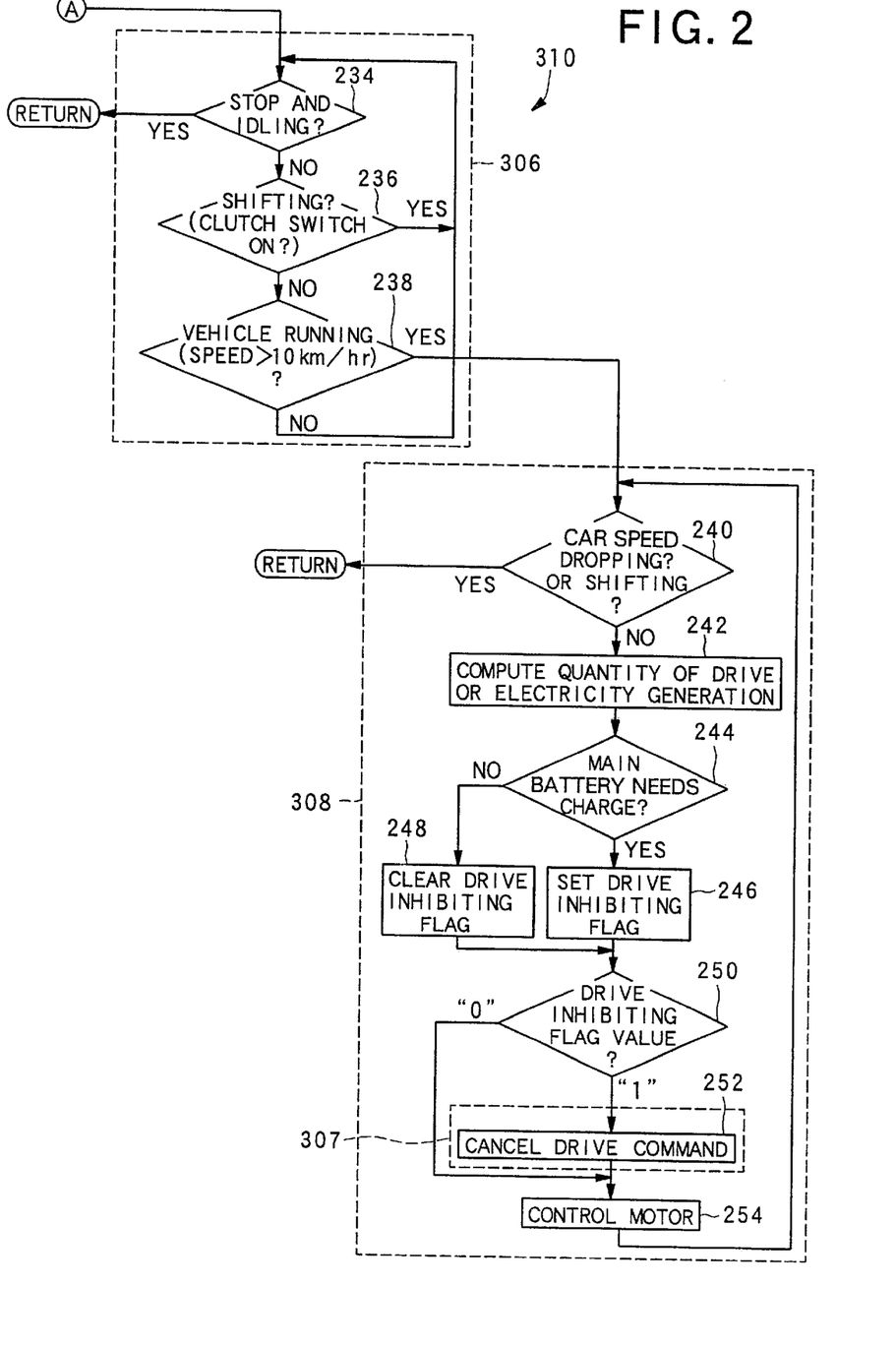
FIG. 2 is a control flowchart in a running control state.

The motor control means 22 is also provided, as shown in FIGS. 2 and 3, with a driving and electric generation enabling control state 30, a driving inhibiting control state 307, and a driving and power generation inhibiting control state 306 set as the running control states 310. The motor control means 22 controls so as to enable the drive and electric generation of the motor 6 in the driving and electric generation enabling control state, to inhibit the drive of the motor 6 and to enable the electric generation thereof in the driving inhibiting control state, and to inhibit the drive and electric generation of the motor 6 in the driving and electric generation inhibiting control state.

Figure 4:
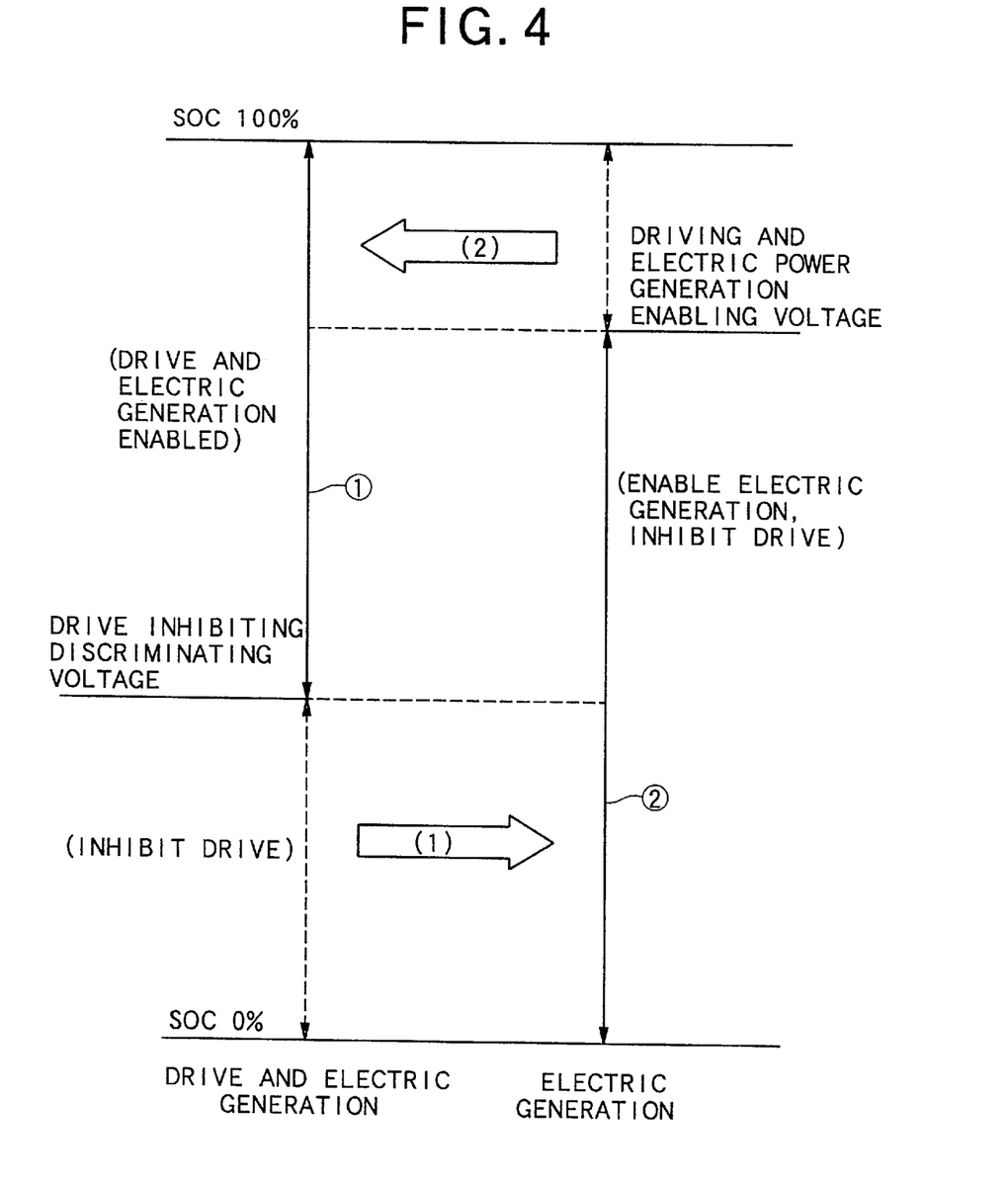
FIG. 4 is a diagram showing the transition of control based on the main battery voltage.
Figures 5, 6:
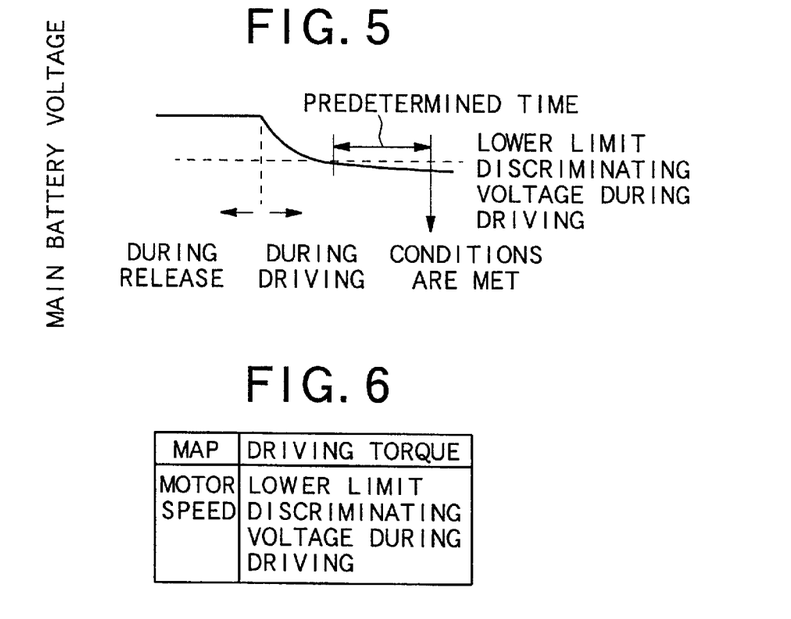
FIG. 5 is a timing chart of the main battery voltage for explaining lower limit discriminating voltage during driving.
FIG. 6 is a map of the lower limit discriminating voltage during driving for a motor speed and driving torque.

The transition between the drive and electric generation enabling control state and the drive inhibiting control state in the running control state is made based on the main battery voltage of the main battery 38 managed by the main battery state managing section 152 of the motor control means 22 as shown in FIG. 4.

The motor control means 22 controls so as to enable the drive and electric generation of the motor 6 because it is in the electric generation enabling control state arising when the state of change (SOC) of the main battery voltage is 100% (i.e. the battery is less than 100% charged), and transfers to the drive inhibiting control state when the main battery voltage drops below the lower limit drive inhibiting voltage as shown in FIG. 4.

In the drive inhibiting control state, the motor control means 22 controls so as to inhibit the drive of the motor 6 and to generate electricity until the main battery voltage reaches the drive and electric generation enabling voltage. When the main battery voltage exceeds the drive and electrical power generation enabling voltage, the motor control means 22 transfers to the drive and power generation enabling control state to control so as to enable the drive and power generation of the motor 6.

Figure 7:
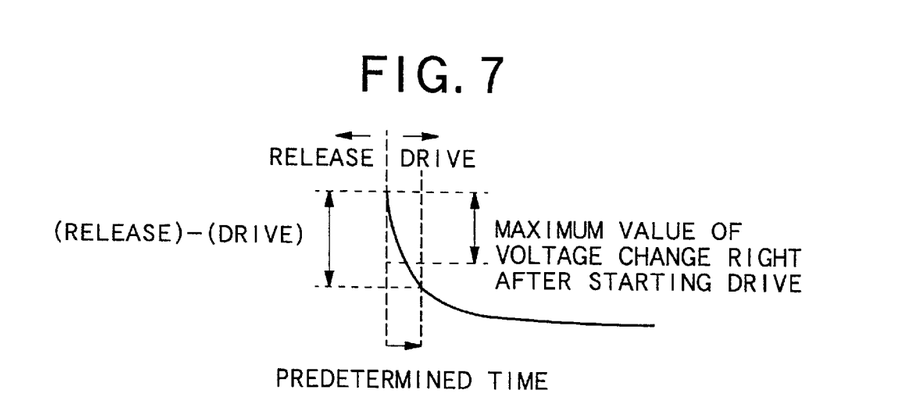
FIG. 7 is a timing chart of the main battery voltage for explaining the maximum value of voltage change right after starting drive.
Figure 8:
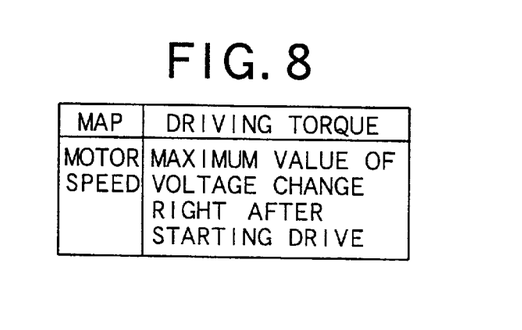
FIG. 8 is a map of the maximum value of voltage change right after starting drive for a motor speed and driving torque.
Figure 9:
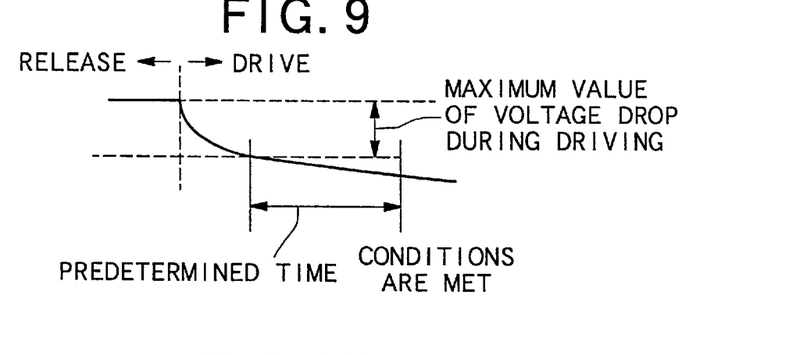
FIG. 9 is a timing chart of the main battery voltage for explaining the maximum value of voltage drop during driving.
Figure 10:
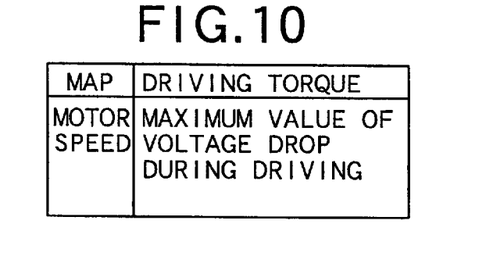
FIG. 10 is a map of the maximum value of voltage drop during driving for a motor speed and driving torque.

The transition from the drive and power generation enabling control state to the drive inhibiting control state is carried out when any one of the following transition conditions occurs:
 (1) the main battery release voltage<drive inhibiting voltage for a predetermined time;
 (2) the main battery voltage during driving<lower limit of voltage for driving (predetermined value for each driving torque) for a predetermined time;
 (3) the main battery release voltage—voltage during driving>maximum value of voltage change right after driving (predetermined value for each driving torque) at the point of time when a predetermined time has elapsed after starting to drive the motor 6 (see FIGS. 7 and 8);
 (4) the main battery release voltage>maximum value of voltage drop during driving (predetermined value for each driving torque) for a predetermined time (see FIGS. 9 and 10); and
 (5) checking the main battery release voltage by stopping the motor 6 at the point of time when a predetermined time has elapsed after starting to drive the motor 6, and the main battery release voltage<drive stoppage voltage (predetermined value per torque)] for a predetermined time.

It is noted that when the condition of (5) is not true, the drive of the motor 6 is started again.

Figure 11:
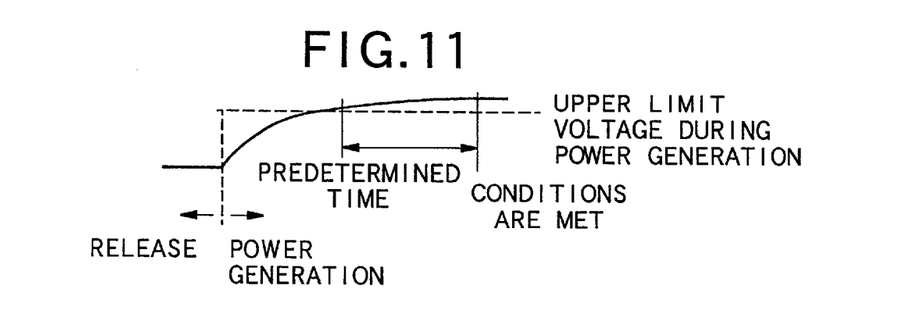
FIG. 11 is a timing chart of the main battery voltage for explaining the upper limit discriminating voltage during electric generation.
Figure 12:
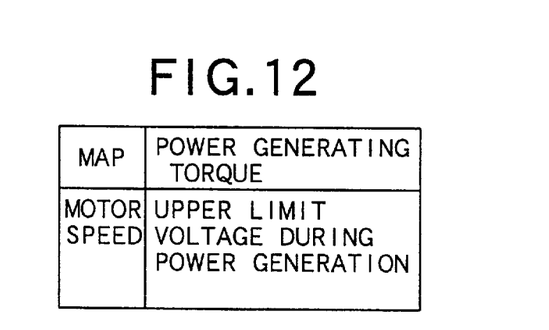
FIG. 12 is a map of the upper limit discriminating voltage during power generation for a motor speed and driving torque.

The transition from the drive inhibiting control state to the drive and power generation enabling control state is carried out when any one of the following transition conditions holds:
 (1) the main battery release voltage>driving and electric generation enabling voltage for a predetermined time;
 (2) the main battery voltage during electric generation<upper limit voltage during electric generation (predetermined value for each driving torque) for a predetermined time (see FIGS. 11 and 12); and
 (3) detecting the main battery release voltage by stopping the motor 6 at the point of time when a predetermined time has elapsed after starting the electric generation of the motor 6, and the main battery release voltage>driving and power generation enabling voltage for a predetermined time.

It is noted that the motor control means 22 returns to the control state that existed before the carrying out of the test of the transition condition (3) after ending the test of the transition condition (3) regardless of whether the transition condition holds or not, and continues the control functions. The time of this return shall be defined to be the new electric generation starting time.

Next, the operation will be explained along the control flowcharts in FIGS. 1 and 2.

The motor control means 22 is provided with the stopping control state and the running control state set as the control states based on the operational state of the vehicle as shown in FIG. 3.

When the control is started (200) in the vehicle stopping control state as shown in FIG. 1, the motor control means 22 initializes (202) and judges whether or not the engine 4 is starting (204).

When this judgment (204) is YES, it judges whether or not the start of the engine 4 is complete (206). When this judgment (206) is YES, it returns to the judgment (204). When this judgment (206) is NO, the motor control means 22 drives the motor 6 so that it assists the start of the engine 4 (208) and then returns to the judgment (206).

When the judgment (204) is NO, the motor control means 22 judges whether or not the vehicle is running (210). When this judgment (210) is YES, the motor control means 22 transfers to the running control state as described later. When this judgment (210) is NO, it judges whether or not the idling is unstable (212).

When this judgment (212) is YES, it judges whether or not the idling has been stabilized (214). When this judgment (214) is YES, it returns to the judgment (212). When this judgment (214) is NO, it drives the motor 6 in the idling stabilizing driving control state to stabilize the idling of the engine 4 (216) and then returns to the judgment (214).

When the judgment (212) is NO, it judges whether or not the vehicle has started to move(218). When this judgment (218) is YES, it judges whether or not the start of movement has been completed (220). When this judgment (220) is YES, it returns to the judgment (218). When this judgment (220) is NO, it controls and drives the motor 6 in the movement initiation driving control state so as to assist the start of movement of the vehicle (222) and then returns to the judgment (220).

When this judgment (218) is NO, it judges whether or not the engine 4 has been stalled (224). When this judgment (224) is YES, it returns to the judgment (204). When this judgment (224) is NO, it determines whether or not the engine is in a cold state and whether the water temperature is low (226).

When this judgment (226) is NO, it returns to the judgment (204). When this judgment (226) is YES, it judges whether or not the charging of the main battery 38 is required (228).

When the charging of the main battery 38 is not required and the judgment (228) is OK, it returns to the judgment (204). When the charging of the main battery 38 is required and the judgment (28) is NG, the motor control means 22 calculates a quantity of electric generation (230), controls electric power generation function of the motor 6 (232) and then returns to the judgment (204).

When the vehicle is running and the judgment (210) is YES, it transfers to the running control state shown in FIG. 2 via the drive and power generation inhibiting control state. In the drive and power generation inhibiting control state, the motor control means 22 judges whether or not the vehicle is stopping and is idling (234).

When this judgment (234) is YES, it returns to the judgment (210) in the idling control state shown in FIG. 1. When this judgment (234) is NO, it judges whether or not the clutch switch 160 is ON, e.g during transmission gear changing or neutral state (236).

When this judgment (236) is YES, it returns to the judgment (234). When this judgment (236) is NO, it judges whether or not the vehicle is running based on the car speed signal from the car speed sensor 76 (238). For example, the judgment (238) can judge whether the vehicle is traveling at a speed greater than 10 km/h.

When this judgment (238) is NO, it returns to the judgment (234). When this judgment (238) is YES, it transfers to the drive and power generation enabling control state in the running control state and judges whether or not the car speed is dropping or the clutch switch 160 is ON, e.g. during transmission gear changing or neutral state (240).

When this judgment (240) is YES, it returns to the judgment (234). When this judgment (240) is NO, it calculates the quantity of drive or electric generation (242) and decides whether to give a driving command or an electric generating command. Then, it judges whether or not the main battery 38 needs to be charged (244).

When the main battery 38 needs to be charged and this judgment (244) is YES, it sets the drive inhibiting flag to be "1" or ON (246). When the main battery 38 needs no charging and the judgment (244) is NO, it clears the drive inhibiting flag as "0" or OFF (248).

Next, the motor control means 22 judges whether the drive inhibiting flag is "1" or "0" (250). When this judgment (250) is "1", the motor control means 22 transfers to the drive inhibiting control state. When the result calculated by the process (242) was the driving command, the motor control means 22 cancels this driving command of the motor 6 (252) and validates only the electric generation command. When this judgment (250) is "0", it validates the result calculated in the process (242), controls in accordance with the valid driving command or the electric generation command (254) and then returns to the judgment (240).

Thus, the controller 18 of the vehicle propulsion system 2 is provided with the motor 6 having the driving and electric generating functions directly connected to the engine 4, the engine control means 20 for controlling the operating condition of the engine 4, and the motor control means 22 for controlling the driving and electric generating states of the motor 6 based on the operating condition of the engine 4 and the vehicle running condition independently from the control of the engine 4 by the engine control means 20.

Thereby, the controller 18 of the vehicle propulsion system 2 can control the engine 4 and the motor 6 separately by the respective control means 20 and 22 which are independent from each other, and can both simplify the control process and achieve reductions of costs. The independence from the control of the engine 4 made by the engine control means 20 results in the control of the motor 6 being performed while not preventing the engine controlling input signal from being communicated to the engine controlling output, a separate process from engine control. That is, the motor control means 22 controls the motor 6 not based on the output indicated on the output state of the engine control means but on the operating condition of the engine 4 indicated in the input stage. Thereby, the motor control means 22 can make quick judgments and simplify the system by specifying the engine controlling output uniquely through its map inspection.

Thus, the controller 18 of the vehicle propulsion system 2 can simplify the controls of the engine 4 and the motor 6 and can improve the reliability of the control of the motor 6 by the simplification of the controller. Further, even when the main battery voltage of the main battery 38 drops and it is difficult to drive the motor 6, the controller 18 can control the engine 4 by the engine control means 20 independently from the motor control means 22 and can have the vehicle run only using the engine 4.

The motor control means 22 is also provided with the stopping control state and the running control state set as the control states based on the vehicle running state and controls so as to undergo the drive and electric generation inhibiting control state for inhibiting the drive and electric generation of the motor 6 when transferring between the stopping control state and the running control state.

Thereby, the controller 18 of the vehicle propulsion system 2 can control the motor 6 simply and suitably for the stopping and running states of the vehicle and can improve the reliability of control by controlling so as to induce the drive and electric generation inhibiting control state for inhibiting the drive and electric generation of the motor 6.

The motor control means 22 is also provided with the main battery 38 which supplies the driving electricity to the motor 6 and which is charged by the electricity generated by the motor 6 and the main battery voltage detector 162 for detecting the main battery voltage of the main battery 38 to manage the condition of the main battery based on the main battery voltage signal inputted from the main battery voltage detector 162.

Therefore, the controller 18 of the vehicle propulsion system 2 can simplify the system.

Moreover, the motor control means 22 sets the idling power generation state, the vehicle movement initiation drive control state, the engine starting drive control state and the idling stabilizing drive control state as the stopping control states and controls so as to charge the main battery 38 by generating power by the motor 6 in the idling power generation state, so as to assist the start of the vehicle movement by driving the motor 6 in the vehicle starting drive control state, so as to assist the start of the engine 4 by driving the motor 6 in the engine starting drive control state, and so as to stabilize the idling of the engine 4 by driving the motor 6 in the idling stabilizing drive control state.

That is, the controller 18 of the vehicle propulsion system 2 can realize a smooth and stable running state by reducing the fluctuation of torque or the fluctuation of rotation of the engine 4 by controlling so as to assist the rotation by giving driving force to the engine 4 or so as to suppress the rotation by giving load thereto by the motor 6 directly connected to the engine 4. Then, it can hold the operating condition of the engine 4 in the region where the burning efficiency is good (stoichiometric region, lean-burn region, etc.).

The engine control means 20 which controls such a so-called well-designed engine 4 whose operating condition is stable requires no complicated program and allows the program to be simplified because the control is more easily achieved. It also matches well with the lean-burn control, variable valve timing control etc. because it is sufficient to merely carry out combustion control that matches the range of conditions at which driving occurs.

Therefore, the controller 18 of the vehicle propulsion system 2 can realize an engine 4 whose running state is stable by facilitating the start of the engine 4, stabilizing its idling running state, and preventing the stall of the engine 4. Further, because the running state of the motor 6 is stable, the control of the engine 4 by the engine control means 20 may be facilitated. The control by the engine control means 20 may also be simplified and the costs may be reduced.

Further, the motor control means 22 sets the drive and electric generation enabling control state, the drive inhibiting control state, and the electric generation inhibiting control state as the running control state and controls so as to enable the drive and electric generation of the motor 6 in the drive and electric generation enabling control state based on the main battery voltage of the main battery 38, so as to inhibit the drive of the motor 6 and to enable electric generation thereof in the drive inhibiting control state, and so as to inhibit the drive and electric generation of the motor 6 in the drive and electric generation inhibiting control state. Because the motor 6 is directly mechanically connected to the engine 4 as the vehicle propulsion system 2 in the present invention, the drive and electric generation inhibiting control state described above is an essential control state and the motor control means 22 transfers the control state temporarily to the drive and electric generation inhibiting control state in changing the shift, in neutral during running, and in dropping the car speed just before stopping the car (during deceleration) in the running control state.

Therefore, the controller 18 of the vehicle propulsion system 2 can adequately control the driving and electric generating functions of the motor 6, can prevent over-discharge and over-charge of the main battery 38 and can adequately discharge and charge the main battery 38, thus prolonging the life of the main battery 38.

The motor control means 22 can also smooth the drop of the engine speed during the deceleration, can prevent the engine speed from dropping excessively below the idle speed at the final period of the deceleration and can thus realize the stable running state by controlling so as to assist the engine 4 by driving the motor 6 during the deceleration at the running control state. It can also improve the acceleration responsiveness by controlling so as to assist the acceleration of the vehicle by driving the motor 6 during acceleration after deceleration.

Still more, because the motor control means 22 controls the motor 6 so as to generate power and to charge the main battery 38 when the engine 4 is cold, it can apply the generated and stored electricity to the engine 4 during the cold running, can accelerate the warm-up of the engine 4 and catalysts by applying this electricity and can reduce the discharge of exhaust detrimental components. It is noted that the motor control means 22 can be made to control the motor more adequately by learning each control state of the motor 6.

Thus, the inventive controller of the vehicle propulsion system can control the engine and the motor by the respective independent control means and can simplify the control by providing the motor control means for controlling the driving state and the electric generation state of the motor based on the engine operating condition and the vehicle running condition independently from the control of the engine made by the engine control means.

Therefore, the controller of the vehicle propulsion system can simplify the control of the engine and the motor, can improve the reliability of the control of the motor by the simplification of the control, and can reduce costs. It can also control the engine by the engine control means independently from the motor control means and allows the vehicle to run utilizing only the engine when the main battery voltage drops and it is difficult to drive the motor.

Although a particular preferred embodiment of the invention has been disclosed in detail for illustrative purposes, it will be recognized that variations or modifications of the disclosed apparatus, including the rearrangement of parts, lie within the scope of the present invention.

The invention claimed is:

1. A controller of a vehicle propulsion system in a vehicle wherein an engine and a motor having a driving function and an electric generating function are provided as the vehicle propulsion system, said motor being directly connected to said engine, said controller comprising an engine control means for controlling an operating condition of said engine and a motor control means for controlling a driving condition and electric generating condition of said motor based on the engine operating condition and a vehicle driving condition independent from the control of the engine by said engine control means, wherein said motor control means sets a stopping control state and a running control state based on the driving condition of said vehicle and controls so as to pass through a drive and electric generation inhibiting control state for inhibiting the drive and power generation of said motor in transferring between the stopping control state and the running control state.

2. The controller of the vehicle propulsion system according to claim 1, wherein said motor control means controls a main battery state of a main battery which supplies driving electric power to said motor and which is charged by generated electricity of said motor based on a main battery voltage.

3. The controller of the vehicle propulsion system according to claim 1, wherein said motor control means sets an idling drive control state as the vehicle stopping control state and controls to charge a main battery with the electricity generated by said motor in the idling drive control state.

4. The controller of the vehicle propulsion system according to claim 1, wherein said motor control means sets a vehicle starting drive control state as the stopping control state to assist the start of said vehicle by driving said motor.

5. The controller of the vehicle propulsion system according to claim 1, wherein said motor control means sets an engine starting drive control state as the stopping control state to assist in the starting of said engine by driving said motor.

6. The controller of the vehicle propulsion system according to claim 1, wherein said motor control means sets an idling stabilizing drive control state as the stopping control state to stabilize the idling of said engine by driving said motor.

7. The controller of the vehicle propulsion system according to claim 1, wherein said motor control means controls so as to transition between said drive and electric generation inhibiting control state and the running control state while running when shifting, during the neutral gear state, and during deceleration to lower vehicle speed just before stopping the vehicle.

8. A method for controlling a vehicle propulsion system, comprising the steps of:

providing an internal combustion engine and an electric motor connected to the engine for assisting in vehicle propulsion and for electrical generation;

inputting operating conditions of the engine into an engine controller;

controlling the engine based on output from the engine controller;

inputting operating conditions of the engine to a motor controller; and controlling the motor based on output from the motor controller independent of the output from the engine controller, wherein the step of controlling the motor includes determining whether the vehicle is stopping or running and setting a motor control state to a respective stopping motor control state or a running motor control state, and inhibiting both motor drive and motor electrical energy generation when transferring from the stopping motor control state to the running motor control state or when transferring from the running motor control state to the stopping motor control state.

9. The method according to claim 8, wherein the step of controlling the motor includes sensing an electrical energy level of a battery, managing power consumption by the motor from the battery, and selectively charging said battery with electrical energy generated by the motor.

10. The method according to claim 8, wherein the step of controlling the motor includes generating electrical energy from the motor to charge a battery when the vehicle is in an idle state.

11. The method according to claim 8, wherein the step of controlling the motor includes energizing the motor with electrical energy from a battery to assist in moving the vehicle when beginning vehicle motion.

12. The method according to claim 8, wherein the step of controlling the motor includes energizing the motor with electrical energy from a battery to assist starting the engine.

13. The method according to claim 8, wherein the step of controlling the motor includes sensing improper idling of the engine and energizing the motor with electrical energy from a battery to assist the engine during improper idling thereof.

14. The method according to claim 8, wherein the step of controlling the motor includes inhibiting drive and electrical generation by the motor when shifting gears, just before stopping the vehicle, and the transmission is in a neutral gear.

15. A controller for a hybrid vehicle including a vehicle propulsion system comprising an internal combustion engine and an electric motor connected to said engine, said electric motor having a driving function and an electric generating function, said controller comprising:

an engine control device connected to said engine for controlling an engine operating condition of said engine, and a motor control device for setting a stopping control state or a running control state for said electric motor based on the engine operating condition and a vehicle running condition independent of the control of said engine by said engine control device, said stopping control state including an idling drive control state for charging a main battery using said electric motor, said motor control device being responsive to predetermined engine operating conditions and vehicle running conditions to transition from said idling drive control state to one of: an idling stabilizing drive control state for stabilizing idling of said engine by driving said electric motor, an engine starting drive control state for assisting starting of said engine by driving said electric motor, and a vehicle movement initiation drive control state for starting movement of said vehicle by driving said electric motor.

16. A controller for a hybrid vehicle including a vehicle propulsion system comprising an internal combustion engine and an electric motor having a driving function and an electric generating function, said electric motor being connected to said engine, said controller comprising:

an engine control device connected to said engine for controlling an operating condition of said engine, and a motor control device connected to said electric motor and connected to vehicle engine sensors for receiving an engine operating condition, said motor control device controlling a driving condition and an electric generating condition of said motor based on the engine operating condition and a vehicle driving state independently from the control of said engine by said engine control device, wherein said motor control device sets a stopping control state or a running control state based on the driving state of said vehicle, and controls the electric motor in a drive and electric generation inhibiting state when transitioning between the stopping control state and the running control state.

17. A method for controlling a vehicle propulsion system, comprising the steps of:

providing an internal combustion engine and an electric motor connected to the engine for assisting in vehicle propulsion and electrical generation;

inputting operating conditions of the engine to an engine controller;

controlling the engine based on an output from said engine controller;

inputting operating conditions of the engine to a motor controller, an output of the motor controller controlling the motor independently of the output of the engine controller;

wherein the motor controller determines whether the vehicle is stopping or running and sets a motor control state to a respective stopping motor control state or a running motor control state, and inhibits both motor drive and motor electrical energy generation when transferring between the stopping motor control state and the running motor control state.

18. The method of claim 17, including the steps of:

sensing starting of the engine, and driving the motor to assist starting of the engine when starting is sensed;

sensing unstable idling of the engine, and driving the motor to stabilize the engine when unstable idling is sensed; and sensing beginning movement of the vehicle, and driving the motor to move the vehicle.

* * * * *